US010339065B2

(12) United States Patent
Jindal et al.

(10) Patent No.: US 10,339,065 B2
(45) Date of Patent: Jul. 2, 2019

(54) OPTIMIZING MEMORY MAPPING(S) ASSOCIATED WITH NETWORK NODES

(71) Applicant: Ampere Computing LLC, Santa Clara, CA (US)

(72) Inventors: Ankit Jindal, Pune (IN); Pranavkumar Sawargaonkar, Pune (IN); Keyur Chudgar, San Jose, CA (US)

(73) Assignee: Ampere Computing LLC, Santa Clara, CA (US)

( * ) Notice: Subject to any disclaimer, the term of this patent is extended or adjusted under 35 U.S.C. 154(b) by 237 days.

(21) Appl. No.: 15/366,251

(22) Filed: Dec. 1, 2016

(65) Prior Publication Data

US 2018/0157595 A1    Jun. 7, 2018

(51) Int. Cl.
*G06F 12/1009*    (2016.01)
*G06F 3/06*    (2006.01)
*G06F 12/109*    (2016.01)
*G06F 12/14*    (2006.01)

(52) U.S. Cl.
CPC .......... *G06F 12/1009* (2013.01); *G06F 3/061* (2013.01); *G06F 3/064* (2013.01); *G06F 3/067* (2013.01); *G06F 3/0664* (2013.01); *G06F 12/109* (2013.01); *G06F 12/1425* (2013.01); *G06F 2212/1016* (2013.01); *G06F 2212/1024* (2013.01); *G06F 2212/152* (2013.01); *G06F 2212/154* (2013.01)

(58) Field of Classification Search
CPC ...... G06F 12/1009; G06F 3/061; G06F 3/064; G06F 3/0664; G06F 3/067; G06F 12/109
See application file for complete search history.

(56) References Cited

U.S. PATENT DOCUMENTS

| 5,226,039 A | 7/1993 | Frank et al. |
| 5,282,201 A | 1/1994 | Frank et al. |
| 5,341,483 A | 8/1994 | Frank et al. |
| 5,541,955 A | 7/1996 | Jacobsmeyer |
| 5,754,764 A | 5/1998 | Davis et al. |
| 6,477,612 B1 * | 11/2002 | Wang .................. G06F 12/1009 711/2 |

(Continued)

FOREIGN PATENT DOCUMENTS

WO    WO 2008-112629 A1    9/2008

OTHER PUBLICATIONS

WIPO Application No. PCT/US2017/063883, International Search Report and Written Opinion of the International Searching Authority, dated Feb. 20, 2018.

*Primary Examiner* — Arvin Eskandarnia
(74) *Attorney, Agent, or Firm* — Alston & Bird LLP

(57) ABSTRACT

Various aspects provide for optimizing memory mappings associated with network nodes. For example, a system can include a first network node and a second network node. The first network node generates a memory page request in response to an invalid memory access associated with a virtual central processing unit of the first network node. The second network node receives the memory page request in response to a determination that the second network node comprises a memory space associated with the memory page request. The first network node also maps a memory page associated with the memory page request based on a set of memory page mappings stored by the first network node.

20 Claims, 11 Drawing Sheets

(56) References Cited

U.S. PATENT DOCUMENTS

| | | |
|---|---|---|
| 6,947,971 B1 | 9/2005 | Amos |
| 9,385,843 B2 | 7/2016 | Khandekar et al. |
| 2003/0115402 A1 | 6/2003 | Dahlgren et al. |
| 2005/0027920 A1* | 2/2005 | Fitzsimmons ...... G06F 13/4022 710/317 |
| 2006/0004944 A1 | 1/2006 | Vij et al. |
| 2008/0092128 A1* | 4/2008 | Corry ...................... G06F 8/443 717/158 |
| 2013/0339652 A1* | 12/2013 | Bybell ................ G06F 12/1009 711/206 |
| 2015/0234669 A1 | 8/2015 | Ben-Yehuda et al. |
| 2015/0347349 A1 | 12/2015 | Raindel et al. |
| 2015/0378930 A1* | 12/2015 | Sahita ................ G06F 12/1009 711/207 |

* cited by examiner

US 10,339,065 B2

OPTIMIZING MEMORY MAPPING(S) ASSOCIATED WITH NETWORK NODES

TECHNICAL FIELD

The subject disclosure relates generally to virtual computer systems, and more particularly to memory mapping(s) in a multi-node network system, and methods associated therewith.

BACKGROUND

A virtual computer is a software computer environment that emulates a hardware computer environment. For example, a hypervisor associated with a virtual computer can emulate a central processing unit and/or other hardware components. In a virtual computer system, an operating system that manages a virtual computer environment can be maintained by a first network node associated with a first processor core. The first network node can receive data packets from a network and provide the data packets to the operating system that manages the virtual computer environment. A second network node associated with a second processor core can also be employed to provide memory page data for the data packet when the data packet is not mapped to the first network node. The first network node and the second network node can also collaboratively handle an invalid memory access associated with a virtual central processing unit of the virtual computer environment. However, it is desirable to reduce cache thrashing (e.g., repetitive memory paging and/or excessive data exchanges with respect to a memory during a memory mapping process) in a virtual computer environment. Furthermore, it is desirable to improve performance of a virtual computer environment by improving memory mapping processes of the virtual computer environment.

The above-described description is merely intended to provide a contextual overview of current virtual computer systems and/or current network systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a first network node and a second network node. The first network node is configured for generating a memory page request in response to an invalid memory access associated with a virtual central processing unit of the first network node. The second network node is configured for receiving the memory page request in response to a determination that the second network node comprises a memory space associated with the memory page request. The first network node is also configured for mapping a memory page associated with the memory page request based on a set of memory page mappings stored by the first network node.

In another example embodiment, a method provides for generating a memory page request in response to an invalid memory access associated with a first network device, receiving a memory page associated with the memory page request, determining a page table entry associated with the memory page based on a set of memory page mappings stored by the first network device, and performing a memory mapping process associated with the page table entry.

In yet another example embodiment, a network device comprises a memory and a memory manager. The memory is configured for storing a set of memory page mappings. The memory manager is configured for generating a memory page request in response to an invalid memory access associated with the network device, receiving a memory page associated with the memory page request, determining a page table entry associated with the memory page based on the set of memory page mappings, and performing a memory mapping process associated with the page table entry.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
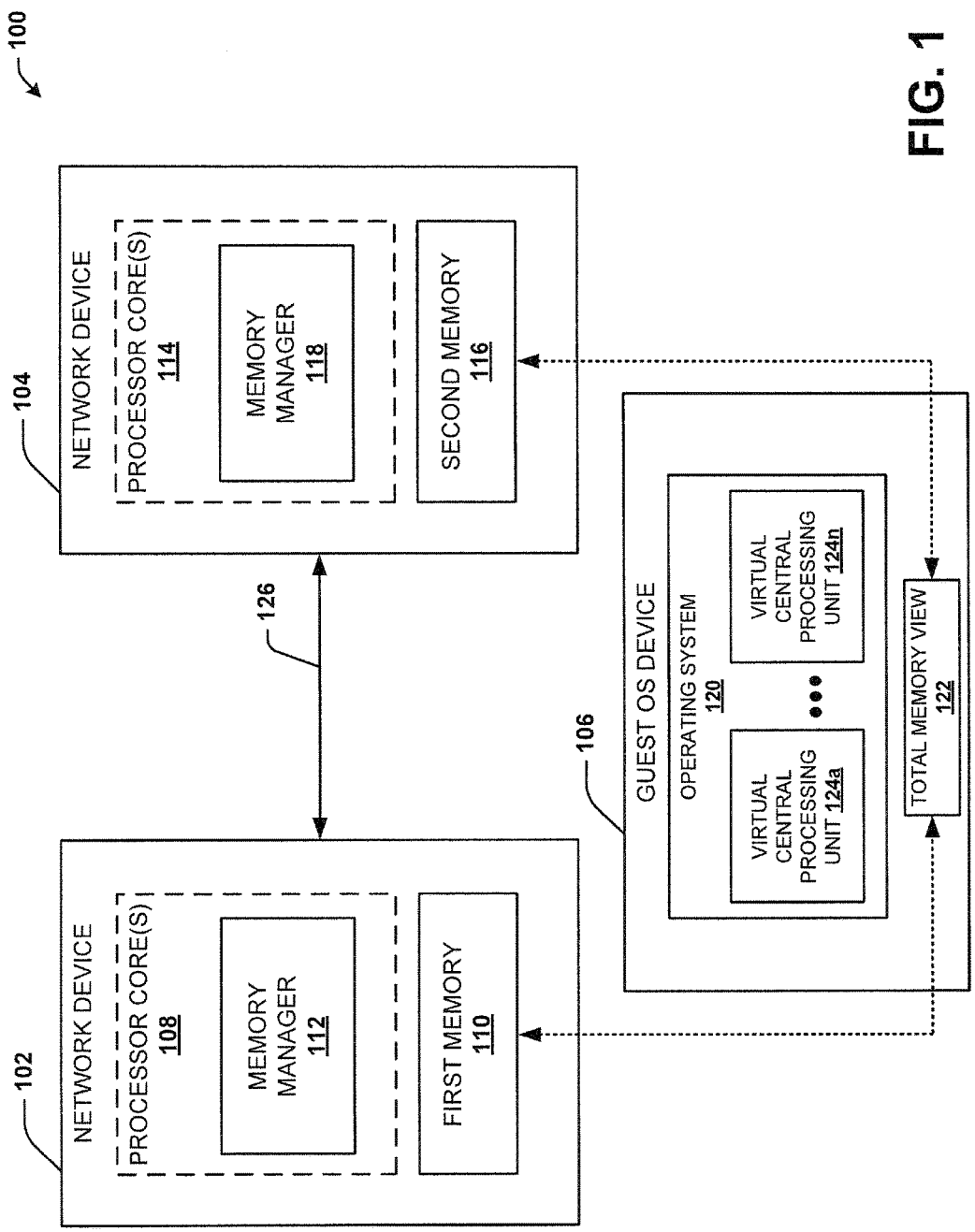
FIG. 1 is a block diagram illustrating an example, non-limiting embodiment of a multi-node system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

In a network system (e.g., a virtual computer network system), a network device (e.g., a network device associated with a virtual central processing unit) can perform an invalid memory access. For example, a virtual central processing unit associated with the network device can attempt to access a guest physical address that is not currently owned by the virtual central processing unit. As such, the network device can perform further processing to determine a memory page associated with the invalid memory access. In certain embodiments, the network device and another network device coupled to the network device can collaboratively handle the invalid memory access. The network device can also perform further processing with respect to the memory page. For example, the network device can parse a memory page table to determine a page table entry for a memory page. Generally, the network device can parse the memory page table during a memory page table walk process associated with the memory page table. However, the memory page table walk process associated with the network device can result in excessive cache thrashing (e.g., repetitive memory paging and/or excessive data exchanges with respect to a memory during the memory page table walk process). Furthermore, the memory page table walk process associated with the network device can result in reduced performance of the network device and/or the network system.

To address these and/or other issues, various aspects of the present disclosure provide an improved multi-node network system (e.g., a multi-node virtual computer network system). For example, memory mapping (e.g., guest physical address mapping) and/or memory un-mapping (e.g., guest physical address un-mapping) associated with a network device can be optimized. In an aspect, a memory page table walk (e.g., a software page table walk) of a memory page table (e.g., a memory translation table) can be removed from a memory mapping process and/or a memory un-mapping process associated with a network device. For instance, rather than performing a memory page table walk process, a set of memory page mappings can be stored by a network device. The set of memory page mapping can be stored by the network device in response to a determination that an operating system associated with the network device satisfies a defined criterion (e.g., in response to a determination that an operating system is booting up). A function (e.g., a hash function) associated with a memory address (e.g., a guest physical address) and/or the set of memory page mappings can also be employed to facilitate memory mapping and/or memory un-mapping associated with the network device. As such, cache thrashing associated with a network device can be reduced, an amount of data accessed during a memory mapping process in a multi-node network system can be reduced, latency associated with an invalid memory access in a multi-node network system can be reduced, latency associated with a memory mapping process in a multi-node network system can be reduced, a number of processing cycles associated with an invalid memory access in a multi-node network system can be reduced, a number of processing cycles associated with a memory mapping process in a multi-node network system can be reduced, and/or performance of a multi-node network system (e.g., performance of a network device in a multi-node network system) can be improved.

Turning now to FIG. 1, a block diagram illustrating an example, non-limiting embodiment of a system 100 in accordance with various aspects described herein is shown. The system 100 can be a multi-node system (e.g., a multi-node coherent system) and/or a network system (e.g., a virtual computer network system) that includes at least a network device 102, a network device 104 and a guest operating system (OS) device 106. In an embodiment, the system can be a memory subsystem of a multi-node system. The network device 102 and the network device 104 can be hardware devices. For instance, the network device 102 can be a first system on a chip (SoC) and the network device 104 can be a second SoC. Furthermore, in an implementation, the guest OS device 106 can be a hardware device that is separate from the network device 102 and the network device 104. In one example, the system 100 can be associated with a virtual network system. The system 100 can be employed by various systems, such as, but not limited to a data center system, a data mining system, a real-time analytics system, a machine learning system, a predictive analysis system, a media content system, a content management system, a computer network system, a communication system, a router system, a server system, a high availability server system (e.g., Telecom server systems), a Web server system, a disk array system, a powered insertion board system, a cloud-based system, and/or another type of system. It is to be appreciated that the system 100 can include more than two network devices. For example, in certain implementations, the system 100 can include four network devices, the system 100 can include eight network devices, etc.

The network device 102 can include at least processor core(s) 108 and a first memory 110. The processor cores(s) 108 can be associated with at least a memory manager 112. The network device 104 can include at least processor core(s) 114 and a second memory 116. The processor cores(s) 114 can be associated with at least a memory manager 118. The guest OS device 106 can be associated with an operating system 120. The operating system 120 can be an operating system associated with the network device 102 and the network device 104. For instance, the operating system 120 can be distributed between the network device 102 and the network device 104 (e.g., between the processor core(s) 108 and the processor core(s) 114). For instance, a first portion of the operating system 120 can be maintained by the network device 102 (e.g., the processor core(s) 108) and a second portion of the operating system 120 can be maintained by the network device 104 (e.g., the processor core(s) 114). Therefore, the network device 102 and the network device 104 can be associated with a corresponding operating system (e.g., the operating system 114). In one example, the network device 102 can be a first node (e.g., a first network node) of a network system and the network device 104 can be a second node (e.g., a second network node) of a network system. Additionally, the network device 102 can be coupled to the network device 104 via a communication channel 126. The communication channel 126 can be a physical communication channel such as, but not limited to, a Peripheral Component Interconnect Express (PCIe) communication channel, an Ethernet communication channel, a remote direct memory access (RDMA) communication channel, another type of communication channel, etc. Furthermore, the communication channel 126 can be associated with a physical transport layer (e.g., a physical transport layer protocol). In an aspect, the memory manager 112 of the network device 102 and the memory manager 118 of the network device 104 can maintain memory coherency across the network device 102 and the network device 104.

The guest OS device 106 can provide a guest OS view associated with the network device 102 and the network device 104. In an aspect, the guest OS device 106 can include a total memory view 122. The total memory view 122 can provide a view of a total amount of memory associated with the first memory 110 of the network device 102 and the second memory 116 of the network device 104. In one example, when the operating system 120 satisfies a defined criterion (e.g., when the operating system 120 boots up), the guest OS device 106 can determine a total amount of memory associated with the network device 102 and the network device 104. For example, the guest OS device 106 can determine total memory available at the first memory 110 of the network device 102 and the second memory 116 of the network device 104 when the operating system 120 satisfies a defined criterion (e.g., when the operating system 120 boots up).

The operating system 120 can be associated with a virtual computer environment. For example, the operating system 120 can be associated with virtual central processing units 124a-n. In certain embodiments, at least the processor cores(s) 108 can be associated with a hypervisor that is responsible for virtualization functionality associated with the network device 102. For example, a hypervisor associated with the processor core(s) 108 can manage virtualization functionality associated with the virtual central processing units 124a-n. A hypervisor associated with the processor core(s) 108 can be computer software or computer firmware that creates and/or runs the virtual central processing units 124a-n associated with the operating system 120. In an embodiment, in addition to managing memory coherency associated with the network device 102 and/or the network device 104, the memory manager 112 can also be a virtual machine manager for the virtual central processing units 124a-n. In an implementation, the guest OS device 106 can correspond to a single virtual central processing unit (e.g., a virtual central processing unit 124a-n) associated with the network device 102 and/or the network device 104.

The network device 102 can generate a memory page request in response to an invalid memory access associated with the network device 102. In an aspect, the network device 102 can generate a memory page request in response to an invalid memory access associated with the virtual central processing units 124a-n. In a non-limiting example, the virtual central processing unit 124a can be associated with an invalid memory access when the virtual central processing unit 124a attempts to access a memory space of the first memory 110 that is not currently owned by the virtual central processing unit 124a. In one example, the virtual central processing unit 124a can be associated with an invalid memory access when the virtual central processing unit 124a attempts to access a guest physical address page that is not currently owned by the virtual central processing unit 124a. The memory page request generated by the network device 102 can be handled by the memory manager 112 in response to a determination that a memory page associated with the memory page request is owned by the network device 102. However, the memory page request generated by the network device 102 can be handled by the network device 104 (e.g., the memory manager 118) in response to a determination that a memory page associated with the memory page request is not owned by the network device 102 (e.g., in response to a determination that a memory page associated with the memory page request is owned by the network device 104). For instance, in response to a determination that a memory page associated with the memory page request is owned by the network device 104, the network device 102 (e.g., the memory manager 112) can transmit the memory page request to the network device 104 (e.g., the memory manager 118) via the communication channel 126. In response to receiving the memory page request, the network device 104 (e.g., the memory manager 118) can determine and/or locate memory data (e.g., a memory page) associated with the memory page request. In one example, the memory data (e.g., the memory page) can be stored in the second memory 116 of the network device 104. The network device 104 (e.g., the memory manager 118) can also transmit the memory data (e.g., the memory page) to the network device 102 (e.g., the memory manager 112). Then, the network device 102 (e.g., the memory manager 112) can map a memory page associated with the memory page request based on a set of memory page mappings previously stored by the network device 102. The set of memory page mappings can include a set of page table entry addresses for memory pages associated with the first memory 110 and/or the second memory 116. In an embodiment, the memory manager 112 of the network device 102 can allocate the set of memory page mappings in a memory space associated with the network device 102. For instance, the memory manager 112 of the network device 102 can allocate the set of memory page mappings in response to a determination that the operating system 120 satisfies a defined criterion (e.g., in response to a determination that the operating system 120 is booting up). In one example, at boot time, the memory manager 112 of the network device 102 (e.g., a hypervisor of the memory manager 112) can allocate the set of memory page mappings in a guest physical address space associated with the first memory 110.

In an implementation, in response to a determination that a virtual central processing unit 124a-n associated with the guest OS device 106 performs an invalid memory access, an abort fault signal (e.g., a data abort fault or an instruction abort fault) can be provided to the memory manager 112. For example, an abort fault signal (e.g., a data abort fault or an instruction abort fault) for a guest physical address page can be provided to the memory manager 112 in response to a determination that a virtual central processing unit 124a-n associated with the guest OS device 106 performs an invalid memory access. A guest physical address page can be physical address page for a virtual central processing unit 124a-n associated with the guest OS device 106. The memory manager 112 can be configured to handle a fault associated with the abort fault signal. For instance, the memory manager 112 can generate a memory page request associated with the invalid memory access. The memory page request can include a request for memory data associated with the invalid memory access. As mentioned above, the memory manager 112 can transmit the memory page request to the network device 104 in response to a determination that the network device 104 owns a memory space associated with the invalid memory access. For example, in response to a determination by the memory manager 112 that a memory space associated with an invalid memory access is owned by another network device (e.g., the network device 104), the memory manager 112 can generate a page request message (e.g., a memory page request).

In an aspect, the memory manager 112 of the network device 102 can determine ownership of a memory page. For instance, the memory manager 112 of the network device 102 can determine whether the network device 102 or the network device 104 is the owner of a memory page. The memory page can be, for example, a guest physical address page. In response to a determination that the network device 104 is the owner of the memory page (e.g., in response to a determination that the memory page is mapped at the network device 104), the memory manager 112 can issue a page request command to the network device 104. The memory manager 112 can issue the page request command, for example, via the communication channel 126. In response to receiving the page request command, the memory manager 118 of the network device 104 can determine a page table entry address for the memory page. Furthermore, the memory manager 118 of the network device 104 can map the memory page by setting a physical address, a valid bit and/or a permission bit in the page table entry of the memory page. However, in response to a determination that the network device 102 is the owner of the memory page (e.g., in response to a determination that the memory page is mapped at the network device 102), the memory manager 112 of the network device 102 can determine a page table entry address for the memory page. Furthermore, the memory manager 112 of the network device 102 can map the memory page by setting a physical address, a valid bit and/or a set of permission bits in the page table entry of the memory page. Then, in response to a determination that the memory page is mapped, control of processing associated with the virtual central processing units 124*a-n* can be returned to the operating system 120. For example, the memory manager 112 can control at least a portion of processing of by the network device 102 in response to an invalid memory access associated with the memory page. Furthermore, after a memory page associated with the invalid memory access is mapped, the portion of the processing can be handed back to the operating system 120.

In certain embodiments, the network device 102 can receive one or more data packets. The one or more data packets can be associated with a network (e.g., an external network, an outside network, etc.). For instance, a data packet can be transmitted to the network device 102 via a network (e.g., an external network, an outside network, etc.). In one example, a data packet can be transmitted to the network device 102 via a coherent optical network. Furthermore, in certain implementations, an invalid memory access performed by the network device 102 (e.g., virtual central processing units 124*a-n* associated with the network device 102) can be associated with a data packet received by the network device 102. In an aspect, a hypervisor associated with the processor core(s) 108 can manage and/or analyze a data packet received by the network device 102. Furthermore, a hypervisor associated with the processor core(s) 108 can forward a data packet to a virtual central processing unit 124*a-n* for further processing. In another aspect, network device 102 can maintain information regarding the system 100 to facilitate transmission of a data packet such as, but not limited to, number of network devices in the system 100 (e.g., number of network nodes in the system 100), number of active network devices in the system 100, network addresses for each network device in the system 100, other information regarding the system 100, etc.

Figure 2:
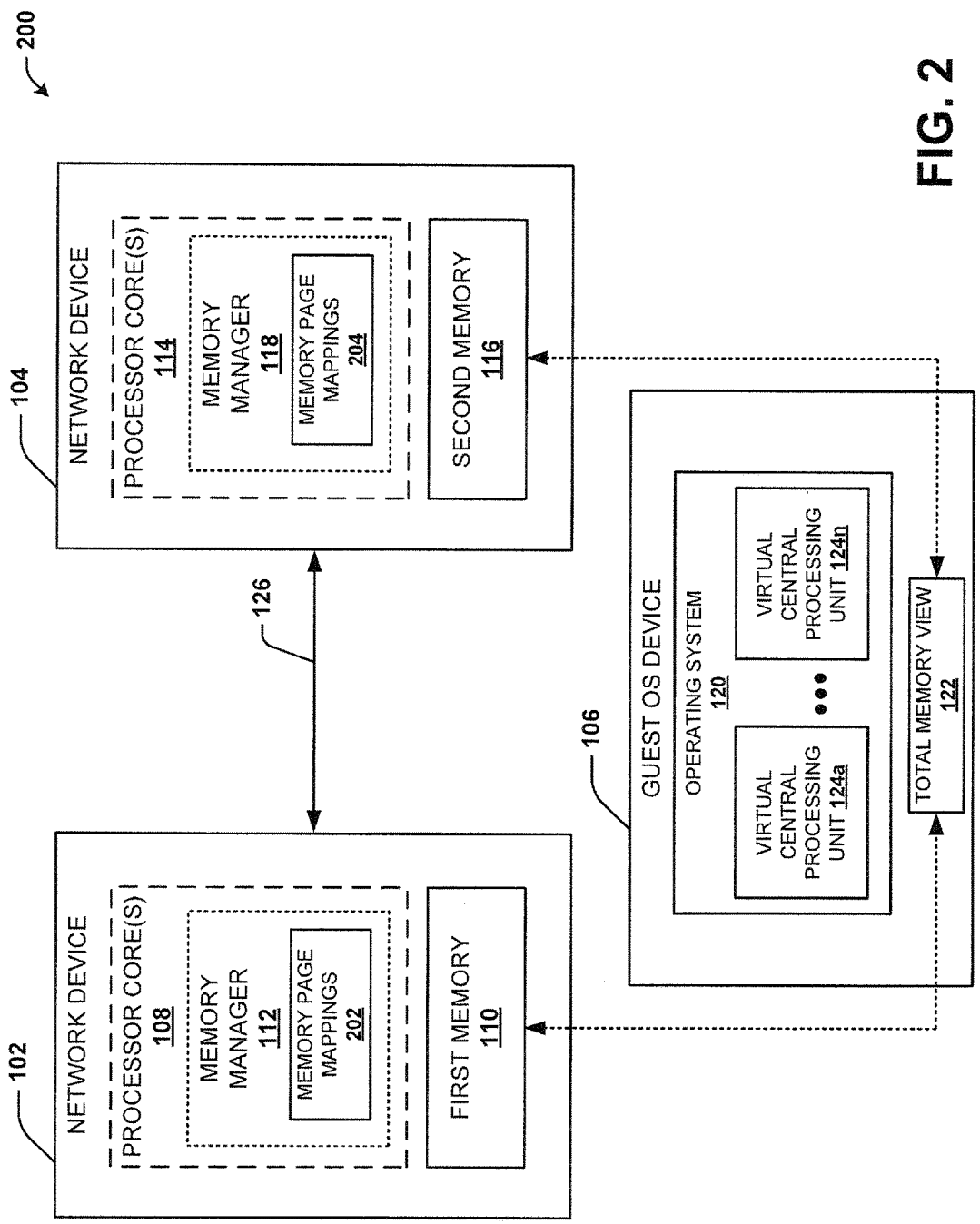
FIG. 2 is a block diagram illustrating another example, non-limiting embodiment of a multi-node system in accordance with various aspects described herein.

FIG. 2 is a block diagram illustrating an example, non-limiting embodiment of a system 200 in accordance with various aspects described herein is shown. The system 200 can be an embodiment of a network system that includes at least the network device 102, the network device 104 and the guest OS device 106. The network device 102 can include the processor core(s) 108 and the first memory 110. The processor cores(s) 108 can be associated with at least the memory manager 112. The network device 104 can include at least the processor core(s) 114 and the second memory 116. The processor cores(s) 114 can be associated with at least the memory manager 118. In an embodiment, the memory manager 112 can include memory page mappings 202. Furthermore, the memory manager 118 can include memory page mappings 204. The guest OS device 106 can be associated with the operating system 120 and/or the total memory view 122.

The memory page mappings 202 can be a set of memory page table mappings maintained by the network device 102. Similarly, the memory page mappings 204 can be another set of memory page table mappings maintained by the network device 104. In an aspect, the memory page mappings 202 can be employed by the network device 102 to facilitate determining memory data and/or performing a memory mapping process for an invalid memory access associated with the network device 102. Furthermore, the memory page mappings 204 can be employed by the network device 104 to facilitate determining memory data and/or performing a memory mapping process for an invalid memory access associated with the network device 102. The memory page mappings 202 can include a set of page table entry addresses for memory pages associated with the first memory 110 and/or the second memory 116. Additionally or alternatively, the memory page mappings 204 can include a set of page table entry addresses for memory pages associated with the first memory 110 and/or the second memory 116.

In an embodiment, the memory page mappings 202 can include a set of page table entry addresses for each memory page (e.g., each guest physical address page) associated with the first memory 110 and/or the second memory 116. Additionally or alternatively, the memory page mappings 204 can include a set of page table entry addresses for each memory page (e.g., each guest physical address page) associated with the first memory 110 and/or the second memory 116. In one example, a set of page table entry addresses associated with the memory page mappings 202 can correspond to a set of page table entry addresses associated with the memory page mappings 204. In another example, a set of page table entry addresses associated with the memory page mappings 202 can be different than a set of page table entry addresses associated with the memory page mappings 204. In another embodiment, the memory page mappings 202 can be guest physical address to physical address page mappings. For example, the memory page mappings 202 can be a set of guest physical address to physical address mappings maintained by the network device 102. Similarly, the memory page mappings 204 can be guest physical address to physical address page mappings. For example, the memory page mappings 204 can be another set of guest physical address to physical address mappings maintained by the network device 104. In yet another embodiment, the memory page mappings 202 and/or the memory page mappings 204 can be generated in response to a determination that the operating system 120 satisfies a defined criterion. For example, the memory page mappings 202 and/or the memory page mappings 204 can be generated in response to a determination that the operating system 120 is booting up. In yet another embodiment, the total memory view 122 can be employed to generate the memory page mappings 202 and/or the memory page mappings 204.

The memory page mappings 202 and/or the memory page mappings 204 can be employed to facilitate removal of a memory page walk process associated with mapping memory data. The memory page mappings 202 and/or the memory page mappings 204 can also facilitate a direct mapping between a memory page (e.g., a guest physical address page) and a page table entry. For instance, a guest physical address page can be mapped to a physical page in real-time (e.g., in constant time) without performing a page table walk. Therefore, modifications to a page table entry can be performed using minimal processing cycles associated with the network device 102 and/or the network device 104. Moreover, employing the memory page mappings 202 and/or the memory page mappings 204 can provide improved system performance associated with the network device 102 and/or the network device 104.

Figure 3:
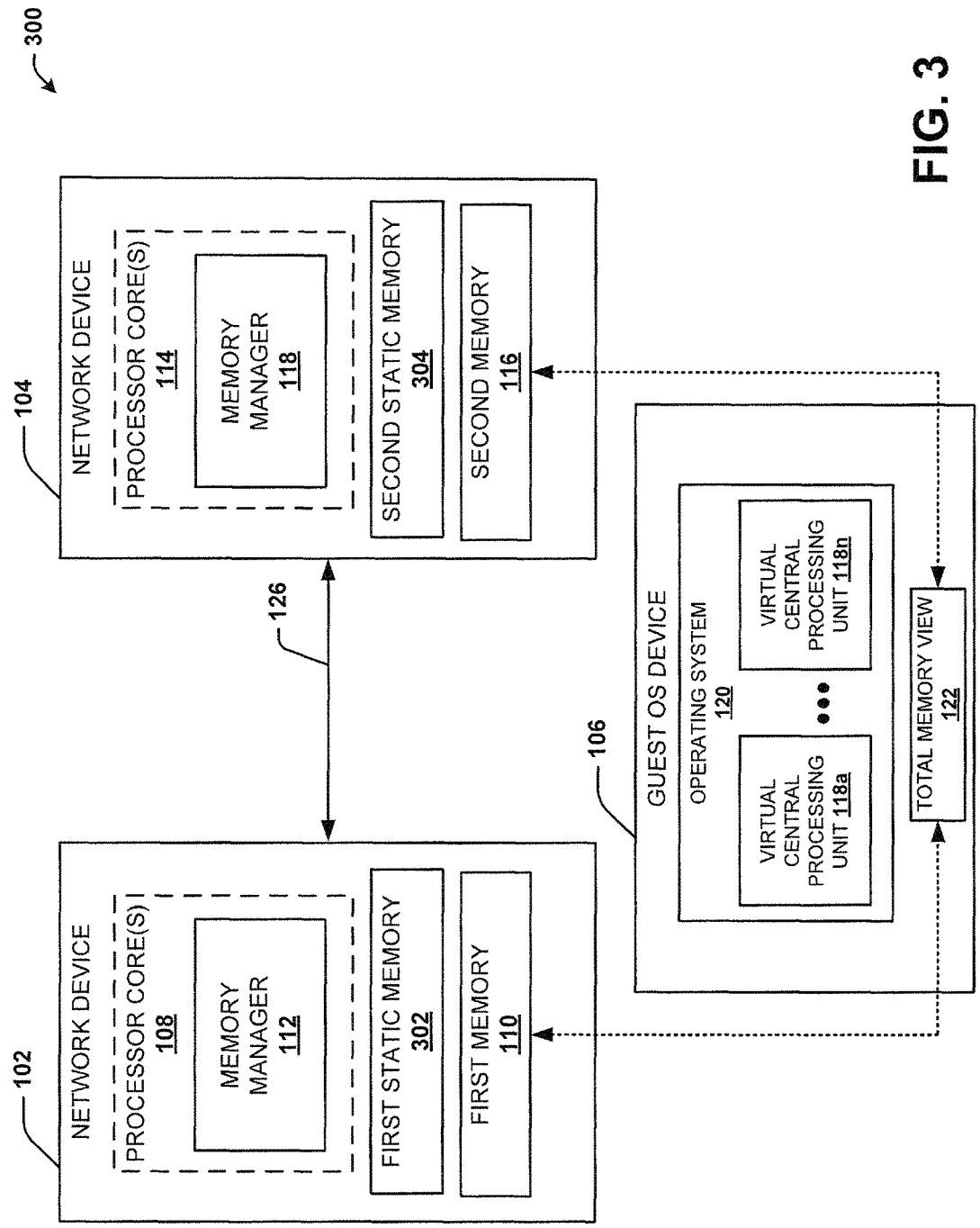
FIG. 3 is a block diagram illustrating yet another example, non-limiting embodiment of a multi-node system in accordance with various aspects described herein.

FIG. 3 is a block diagram illustrating an example, non-limiting embodiment of a system 300 in accordance with various aspects described herein is shown. The system 300 can be an embodiment of a network system that includes at least the network device 102, the network device 104 and the guest OS device 106. The network device 102 can include the processor core(s) 108, the first memory 110 and a first static memory 302. The processor cores(s) 108 can be associated with at least the memory manager 112. The network device 104 can include at least the processor core(s) 114, the second memory 116 and a second static memory 304. The processor cores(s) 114 can be associated with at least the memory manager 118. The guest OS device 106 can be associated with the operating system 120 and/or the total memory view 122.

In an embodiment, the first static memory 302 can store the memory page mappings 202. Furthermore, the second static memory 304 can store the memory page mappings 204. In an aspect, the first static memory 302 can store the memory page mappings 202 and/or the second static memory 304 can store the memory page mappings 204 in response to a determination that the operating system 120 is associated with a defined criterion. For example, the first static memory 302 can store the memory page mappings 202 and/or the second static memory 304 can store the memory page mappings 204 when the operating system 120 is booting up. In another example, the first static memory 302 can store the memory page mappings 202 and/or the second static memory 304 can store the memory page mappings 204 when the network device 102, the network device 104 and/or the guest OS device 106 is powered on.

The first static memory 302 can store a memory page table entry address for each memory page (e.g., each guest physical address page) associated with the network device 102. The first static memory 302 can be allocated at boot time per memory page. Furthermore, the first static memory 302 can be updated with an address of a last level memory page table entry when a memory page table is created for the network device 102 (e.g., when a memory page table is created by a hypervisor associated with the processor core(s) 108). Additionally or alternatively, the second static memory 304 can store a memory page table entry for each memory page (e.g., each guest physical address page) associated with the network device 104. The second static memory 304 can be allocated at boot time per memory page. Furthermore, the second static memory 304 can be updated with an address of a last level memory page table entry when a memory page table is created for the network device 104 (e.g., when a memory page table is created by a hypervisor associated with the processor core(s) 114). In one example, the memory page mappings 202 stored by the first static memory 302 can correspond to the memory page mappings 204 stored by the second static memory 304. In another example, one or more memory page mapping associated with the memory page mappings 202 stored by the first static memory 302 can be different than one or more memory page mapping associated with the memory page mappings 204 stored by the second static memory 304.

Figure 4:
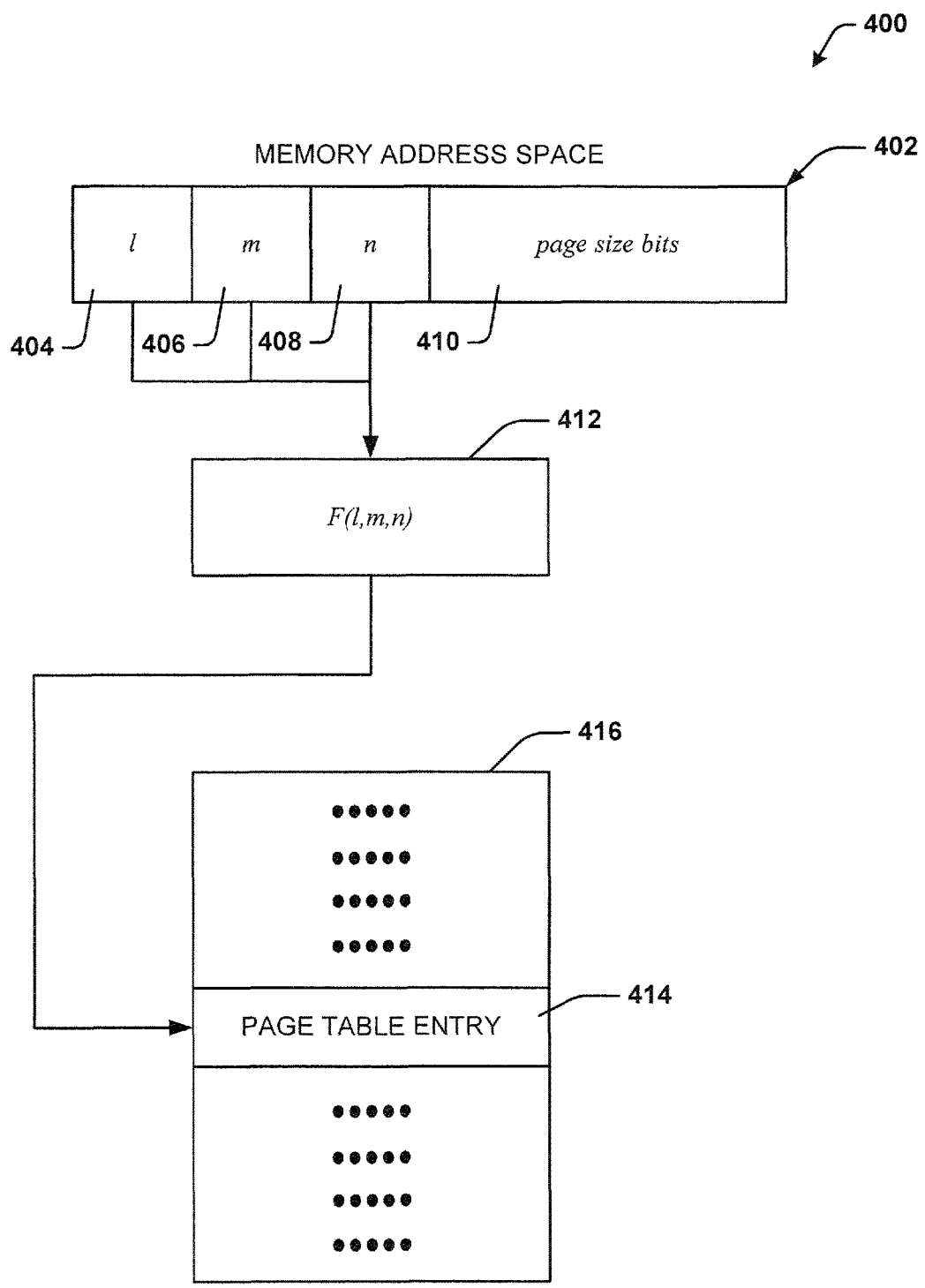
FIG. 4 is a block diagram illustrating an example, non-limiting embodiment of a system associated with a mapping process related to an invalid memory access in accordance with various aspects described herein.

FIG. 4 is a block diagram illustrating an example, non-limiting embodiment of a system 400 in accordance with various aspects described herein is shown. The system 400 can be associated with a mapping process related to an invalid memory access. In an embodiment, the system 400 can be associated with a memory management unit related to the processor core(s) 108 of the network device 102. With the system 400, a memory page table walk (e.g., a software page table walk) with respect to a memory address space (e.g., with respect to guest physical address space) can be removed. For instance, a memory page table walk process associated with a memory address space 402 can be avoided after identification of an invalid memory access associated with the memory address space 402. The memory address space 402 can be, for example, a memory address page. In one example, the memory address space 402 can be a guest physical address space (e.g., a guest physical address page). The memory address space 402 can include a first portion 404, a second portion 406, a third portion 408 and fourth portion 410. The first portion 404 can represent a first page table level l (e.g., an $l^{th}$ entry of a page table), the second portion 406 can represent a second page table level m (e.g., an $m^{th}$ entry of a page table), and the third portion 408 can represent a third page table level n (e.g., an $n^{th}$ entry of a page table). For instance, the first portion 404 can represent a Level-0 page table level, the second portion 406 can represent a Level-1 page table level, and the third portion 408 can represent a Level-2 page table level. The first portion 404, the second portion 406 and the third portion 408 can be combined to form a memory address (e.g., a guest physical address). Furthermore, the fourth portion 410 can represent page size bits for a memory page (e.g., bytes within a memory page).

A function 412 can map the memory address space 402 to a page table entry 414. The page table entry 414 can be a memory page table entry. The function 412 can be, for example, a hash function that can be employed to map data of the memory address space 402 to the page table entry 414. For instance, the function 412 (e.g., a function F(l,m,n)) can employ memory information associated with the first portion 404, the second portion 406 and the third portion 408. The memory information associated with the first portion 404, the second portion 406 and the third portion 408 can be determined from the memory page mappings 202 (e.g., the memory page mappings 202 stored by the first static memory 302) and/or the memory page mappings 204 (e.g., the memory page mappings 204 stored by the second static memory 304). For example, the function 412 can employ the memory page mappings 202 and/or the memory page mappings 204 to determine the memory information associated with the first portion 404, the second portion 406 and the third portion 408 since the memory page mappings 202 and/or the memory page mappings 204 can, for example, be allocated at boot time and do not change during a processing lifetime associated with the network device 102 and/or the network device 104. In an aspect, the function 412 can employ a set of page table entry addresses associated with the memory page mappings 202 and/or the memory page mappings 204 to facilitate mapping a memory address (e.g., a guest physical address) associated with the first portion 404, the second portion 406 and the third portion 408 to the page table entry 414.

The page table entry 414 can be included in a memory page table 416. For example, the memory page table 416 can be a data structure employed to store mappings between virtual addresses and physical addresses. In one example, the memory page table 416 can be a three level memory page table that includes a set of page table entries (e.g., 8192 page table entries) and the page table entry 414 can be a single page table entry of the memory page table 416. In an implementation, the memory address space 402 can be associated with the second memory 116. Furthermore, the page table entry 414 can be associated with the first memory 110. The page table entry 414 can be, for example, a page table entry for the memory address space 402 (e.g., a page table entry for a guest physical address page). In one example, the page table entry 414 can be a physical address page. In an aspect, the function 412 can map the memory address space 402 to the page table entry 414 in constant time without performing a page table walk. For instance, an execution time of the function 412 can be constant for different memory address space inputs.

Figure 5:
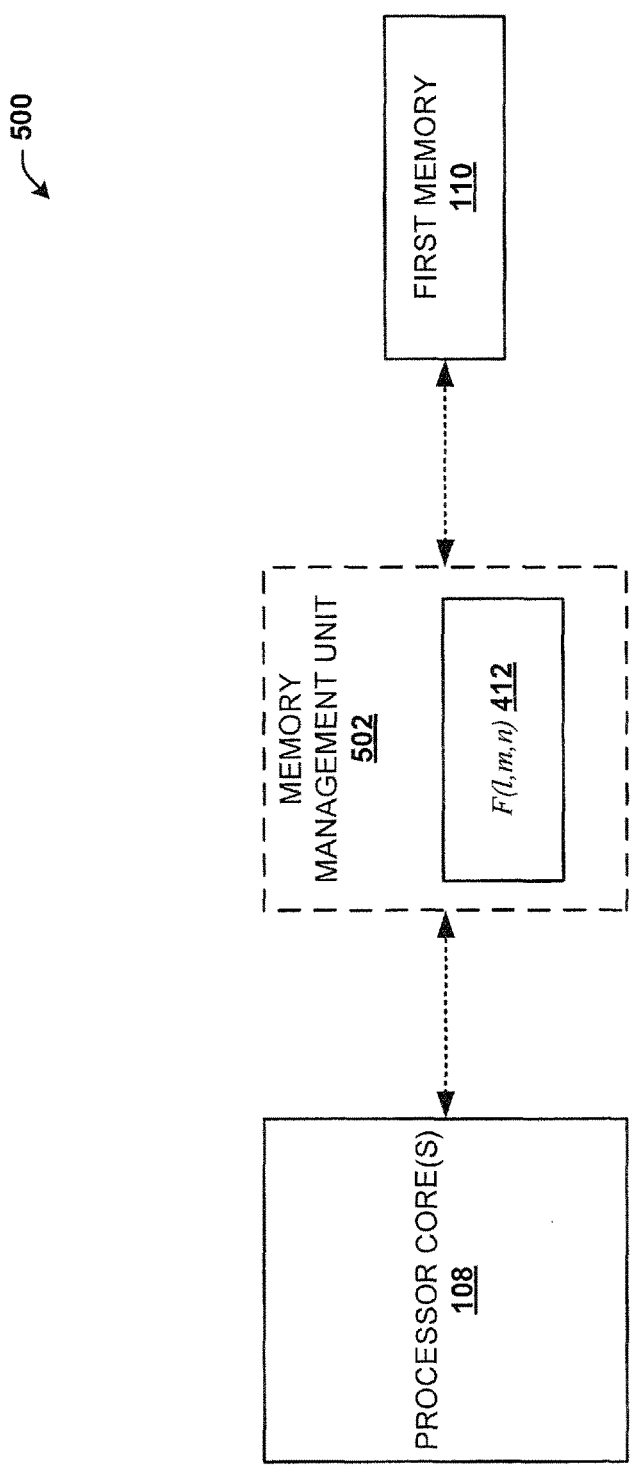
FIG. 5 is a block diagram illustrating another example, non-limiting embodiment of a system associated with a mapping process related to an invalid memory access in accordance with various aspects described herein.

FIG. 5 is a block diagram illustrating an example, non-limiting embodiment of a system 500 in accordance with various aspects described herein is shown. The system 500 can be associated with a mapping process related to an invalid memory access. In an embodiment, the system 500 can be associated with the network device 102. The system 500 can include the processor core(s) 108, a memory management unit 502 and the first memory 110. The memory management unit 502 can be associated with the function 412. For example, the memory management unit 502 can be associated with the memory manager 112. The memory management unit 502 can also allow the network device 102 to perform a mapping process associated with the function 412 while also performing one or more other processing tasks associated with the operating system 120 and/or the virtual central processing units 124a-n. As shown in FIG. 5, the memory management unit 502 can employ the function 412 for mapping a memory page (e.g., a guest physical address page) to a physical address page (e.g., a host physical address page) rather than a memory page walk process.

Figure 6:
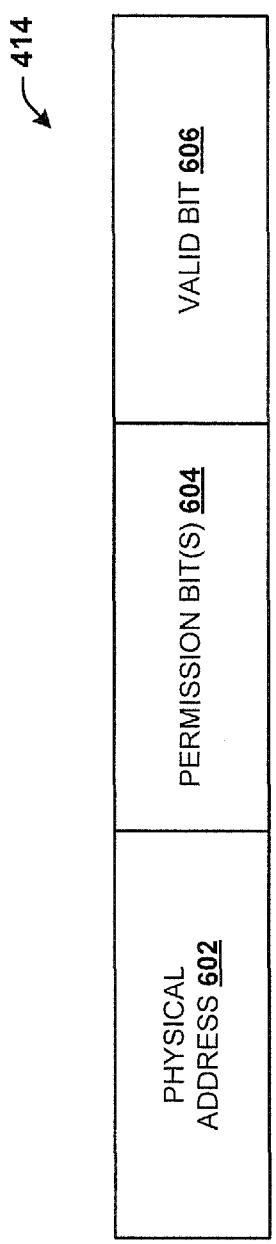
FIG. 6 illustrates an example, non-limiting embodiment of a page table entry in accordance with various aspects described herein.

FIG. 6 is a block diagram illustrating an example, non-limiting embodiment of the page table entry 414 in accordance with various aspects described herein is shown. The page table entry 414 can include a physical address 602, permission bit(s) 604 and/or a valid bit 606. For example, the physical address 602 of the page table entry 414 can correspond to an address of a physical memory (e.g., the first memory 110). The permission bit(s) 604 of the page table entry 414 can correspond to, for example, a set of permissions associated with a memory page related to the page table entry 414. For example, the permission bit(s) 604 of the page table entry 414 can include write permissions, read permissions and/or execute permissions for a memory page associated with the page table entry 414. The valid bit 606 of the page table entry 414 can indicate whether or not a memory page associated with the page table entry 414 is valid or not. For example, the valid bit 606 of the page table entry 414 can indicate whether or not a memory page associated with the page table entry 414 is currently stored in the first memory 110 or not. In an aspect, the network device 102 (e.g., the memory manager 112) can modify the page table entry 414 (e.g., the physical address 602, the permission bit(s) 604 and/or the valid bit 606) during mapping of a memory page (e.g., during a memory mapping process). In another aspect, the network device 102 (e.g., the memory manager 112) can modify the page table entry 414 (e.g., the physical address 602, the permission bit(s) 604 and/or the valid bit 606) in response to executing the function 412.

Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an implementation, the memory manager 112, the memory manager 118 and/or the memory management unit 502 can constitute machine-executable component(s) and instructions embodied within a memory associated with processor core(s) (e.g., the processor core(s) 108 and/or the processor core(s) 114). For example, processor core(s) (e.g., the processor core(s) 108 and/or the processor core(s) 114) can facilitate operation of the instructions (e.g., computer executable components and instructions) by the system 100, the system 200, the system 300, the system 400 and/or the system 500.

Figure 7:
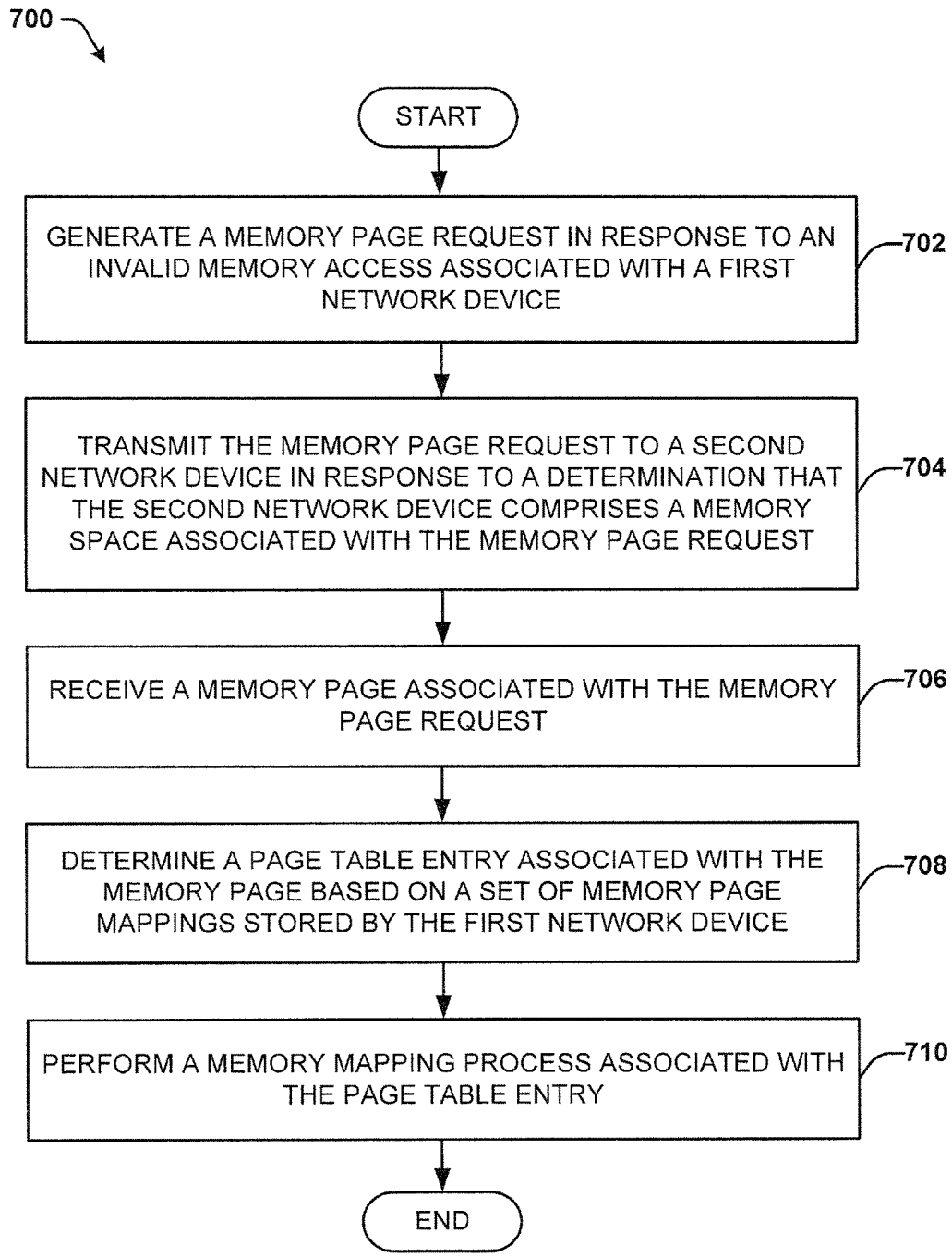
FIG. 7 illustrates a flow diagram of an example, non-limiting embodiment of a method for optimizing memory mappings associated with network nodes.
Figure 8:
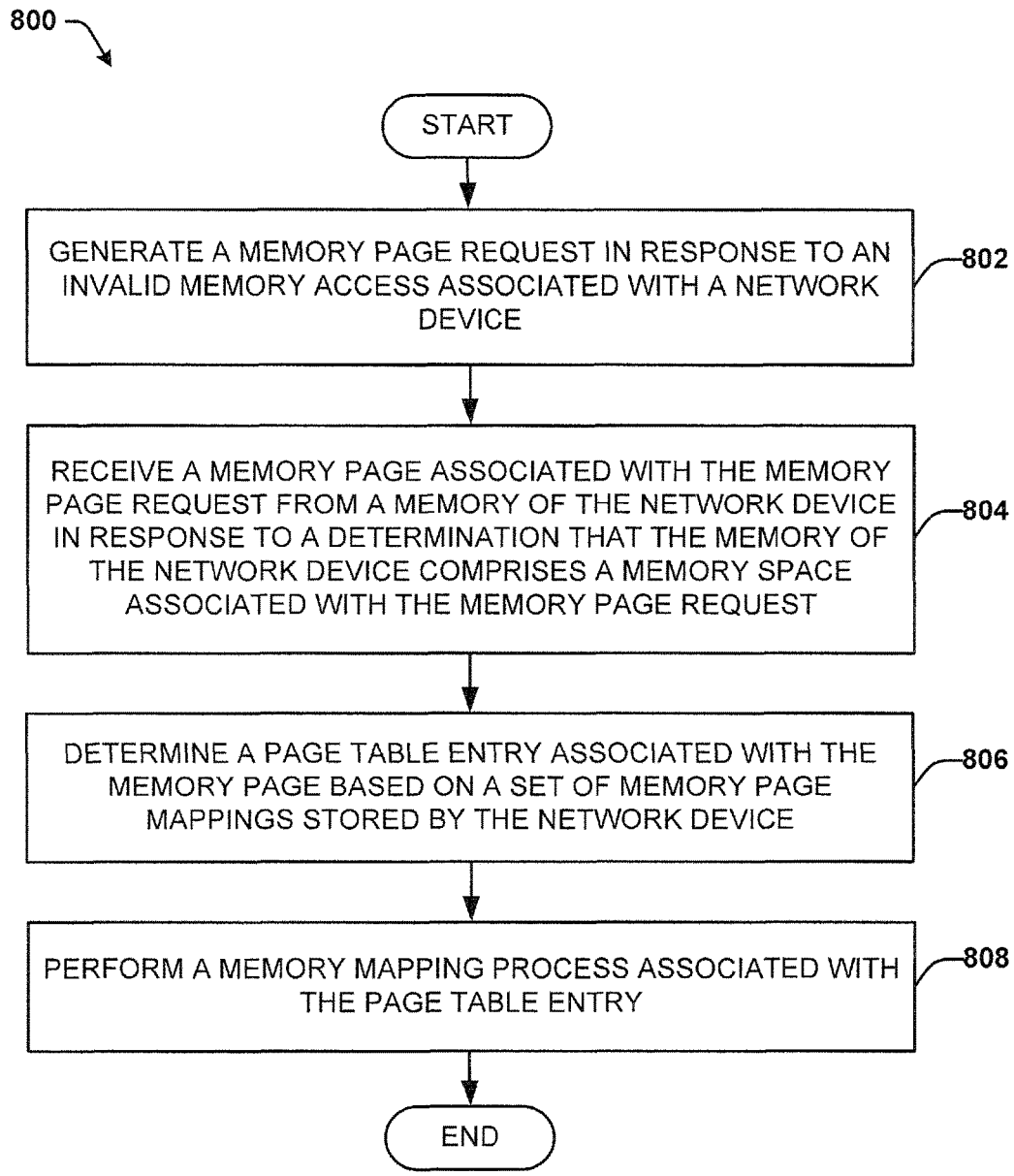
FIG. 8 illustrates another flow diagram of an example, non-limiting embodiment of a method for optimizing memory mappings associated with network nodes.
Figure 9:
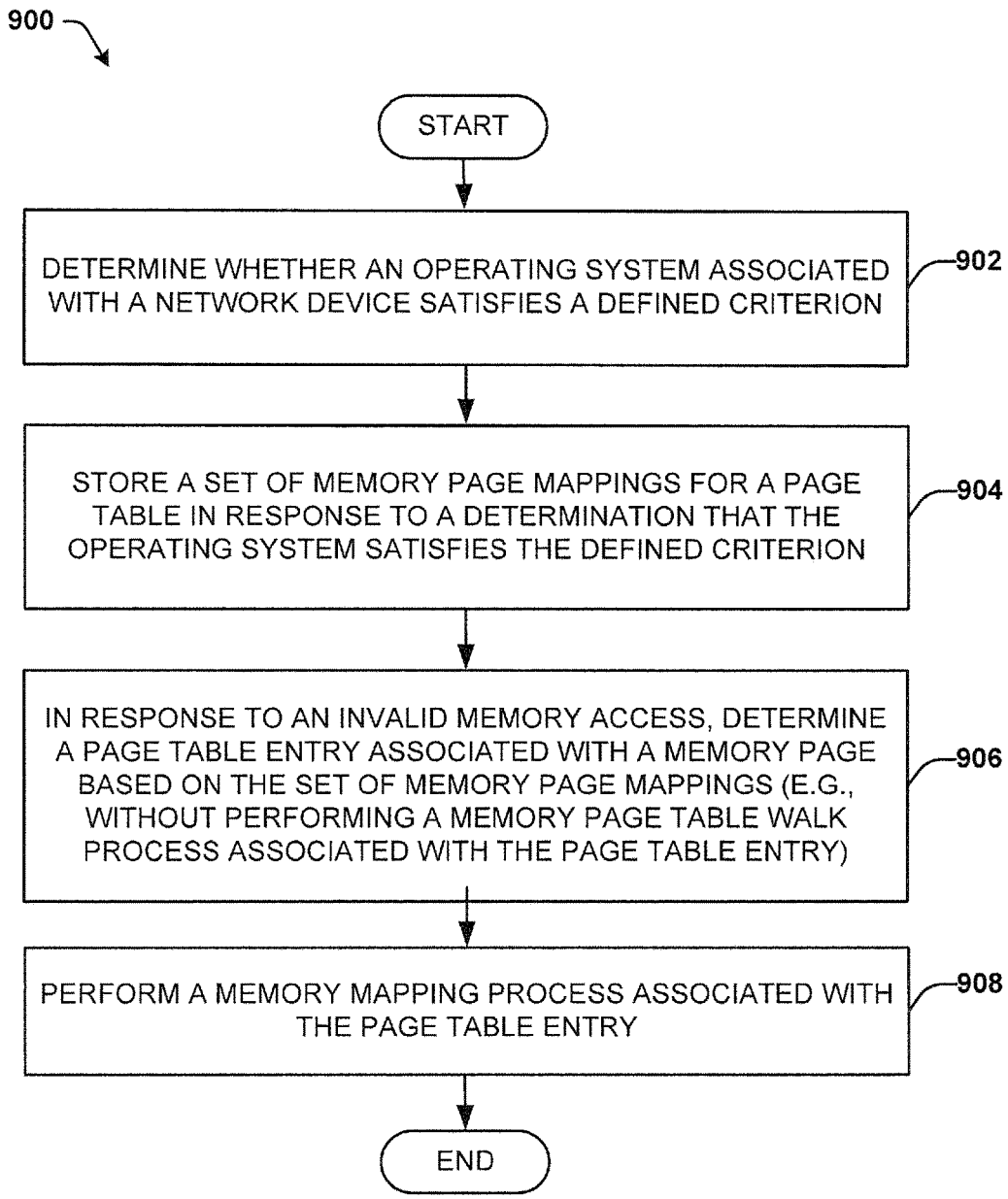
FIG. 9 illustrates yet another flow diagram of an example, non-limiting embodiment of a method for optimizing memory mappings associated with network nodes.

In view of the example systems described above, methods that may be implemented in accordance with the described subject matter may be better appreciated with reference to the flow charts of FIGS. 7-9. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 7, a flow diagram of an example, non-limiting embodiment of a method 700 for optimizing memory mappings associated with network nodes is shown. Method 700 can be associated with a network system (e.g., the system 100, the system 200, the system 300, the system 400 or the system 500). Furthermore, method 700 can be associated with a network device (e.g., the network device 102). Method 700 can begin at block 702, where a memory page request is generated in response to an invalid memory access associated with a first network device. For example, an invalid memory access can be performed by a virtual central processing unit associated with the first network device. At block 704, the memory page request is transmitted to a second network device in response to a determination that the second network device comprises a memory space associated with the memory page request. The second network device can be coupled to the first network device via a physical communication channel. At block 706, a memory page associated with the memory page request is received. For example, the second network device can determine and/or locate the memory page in a memory of the second network device. Furthermore, the second network device can transmit the memory page to the first network device via the physical communication channel. Therefore, the memory page can be received from a memory of the second network device.

At block 708, a page table entry associated with the memory page is determined based on a set of memory page mappings stored by the first network device. For example, a hash function can be employed to map a memory address of the memory page to the page table entry based on the set of memory page mappings. The set of memory page mappings can be previously stored by the first network device and/or the second network device. For example, the first network device and/or the second network device can store the set of page mappings in a memory (e.g., a static memory) of the first network device and/or the second network device in response to a determination that an operating system associated with the first network device and/or the second network device satisfies a defined criterion. In an aspect, the page table entry can be determined without performing a memory page table walk process associated with a memory page table that includes the page table entry. At block 710, a memory mapping process associated with the page table entry is performed. For example, the page table entry can be modified during the memory mapping process.

Referring to FIG. 8, a flow diagram of another example, non-limiting embodiment of a method 800 for optimizing memory mappings associated with network nodes is shown. Method 800 can be associated with a network system (e.g., the system 100, the system 200, the system 300, the system 400 or the system 500). Furthermore, method 800 can be associated with a network device (e.g., the network device 102). Method 800 can begin at block 802, where a memory page request is generated in response to an invalid memory access associated with a network device. At block 804, a memory page associated with the memory page request is received from a memory of the network device in response to a determination that the memory of the network device comprises a memory space associated with the memory page request. At block 806, a page table entry associated with the memory page is determined based on a set of memory page mappings stored by the network device. For example, the set of memory page mapping can be stored in a static memory of the network device. In an aspect, the page table entry can be determined without performing a memory page table walk process associated with a memory page table that includes the page table entry. At block 808, a memory mapping process associated with the page table entry is performed.

Referring to FIG. 9, a flow diagram of yet another example, non-limiting embodiment of a method 900 for optimizing memory mappings associated with network nodes is shown. Method 900 can be associated with a network system (e.g., the system 100, the system 200, the system 300, the system 400 or the system 500). Furthermore, method 900 can be associated with a network device (e.g., the network device 102). Method 900 can begin at block 902, where it is determined whether an operating system associated with a network device satisfies a defined criterion. For example, it can be determined whether an operating system associated with the network device is booting up. The operating system can be associated with a set of virtual central processing units. At block 904, a set of memory page mappings for a page table is stored in response to a determination that the operating system satisfies the defined criterion. For example, the set of memory page mappings can be stored in a static memory of the network device. At block 906, in response to an invalid memory access, a page table entry associated with a memory page is determined based on the set of memory page mappings (e.g., without performing a memory page table walk process associated with the page table entry). In an aspect, the page table entry can be determined without performing a memory page table walk process associated with a memory page table that includes the page table entry. At block 908, a memory mapping process associated with the page table entry is performed.

Example Computing Environment

Figure 10:
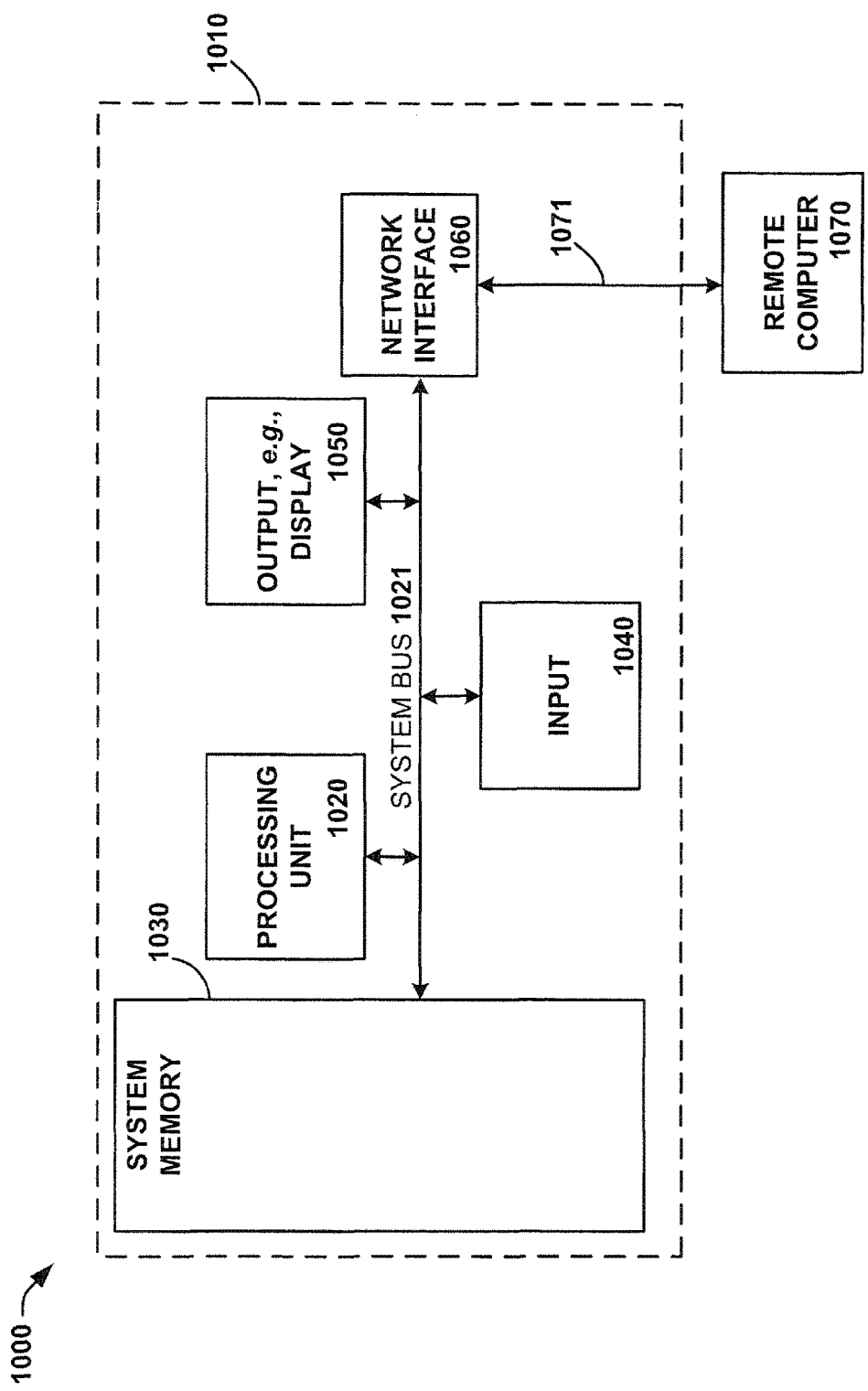
FIG. 10 illustrates a block diagram of an example, electronic computing environment that can be implemented in conjunction with one or more aspects described herein.

As mentioned, advantageously, the techniques described herein can be applied to any device where it is desirable to optimize a memory mapping process associated with a network device (e.g., memory mapping and/or memory un-mapping associated with a network device). It is to be understood, therefore, that handheld, portable and other computing devices and computing objects of all kinds are contemplated for use in connection with the various non-limiting embodiments, i.e., anywhere that a device may wish to optimize a memory mapping process associated with a network device (e.g., memory mapping and/or memory un-mapping associated with a network device). Accordingly, the below general purpose remote computer described below in FIG. 10 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 10 thus illustrates an example of a suitable computing system environment 1000 in which some aspects of the disclosed subject matter can be implemented, although as made clear above, the computing system environment 1000 is only one example of a suitable computing environment for a device and is not intended to suggest any limitation as to the scope of use or functionality of the disclosed subject matter. Neither should the computing environment 1000 be interpreted as having any dependency or requirement relating to any one or combination of components illustrated in the exemplary operating environment 1000.

With reference to FIG. 10, an exemplary device for implementing the disclosed subject matter includes a general-purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Computer 1010 typically includes a variety of computer readable media. Computer readable media can be any available media that can be accessed by computer 1010. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules, or other data in a modulated data signal such as a carrier wave or other transport mechanism and includes any information delivery media.

The system memory 1030 may include computer storage media in the form of volatile and/or nonvolatile memory such as read only memory (ROM) and/or random access memory (RAM). A basic input/output system (BIOS), containing the basic routines that help to transfer information between elements within computer 1010, such as during start-up, may be stored in memory 1030. Memory 1030 typically also contains data and/or program modules that are immediately accessible to and/or presently being operated on by processing unit 1020. By way of example, and not limitation, memory 1030 may also include an operating system, application programs, other program modules, and program data.

The computer 1010 may also include other removable/non-removable, volatile/nonvolatile computer storage media. For example, computer 1010 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1021 through a non-removable memory interface such as an interface, and a magnetic disk drive or optical disk drive is typically connected to the system bus 1021 by a removable memory interface, such as an interface.

A user can enter commands and information into the computer 1010 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1020 through user input 1040 and associated interface(s) that are coupled to the system bus 1021, but may be connected by other interface and bus structures, such as a parallel port, game port, or a universal serial bus (USB). A graphics subsystem can also be connected to the system bus 1021. A projection unit in a projection display device, or a HUD in a viewing device or other type of display device can also be connected to the system bus 1021 via an interface, such as output interface 1050, which may in turn communicate with video memory. In addition to a monitor, computers can also include other peripheral output devices such as speakers which can be connected through output interface 1050.

The computer 1010 can operate in a networked or distributed environment using logical connections to one or more other remote computer(s), such as remote computer 1070, which can in turn have media capabilities different from computer 1010. The remote computer 1070 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1010. The logical connections depicted in FIG. 10 include a network 1071, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1010 can be connected to the LAN 1071 through a network interface or adapter. When used in a WAN networking environment, the computer 1010 can typically include a communications component, such as a modem, or other means for establishing communications over the WAN, such as the Internet. A communications component, such as wireless communications component, a modem and so on, which can be internal or external, can be connected to the system bus 1021 via the user input interface of input 1040, or other appropriate mechanism. In a networked environment, program modules depicted relative to the computer 1010, or portions thereof, can be stored in a remote memory storage device. It will be appreciated that the network connections shown and described are exemplary and other means of establishing a communications link between the computers can be used.

Example Networking Environment

Figure 11:
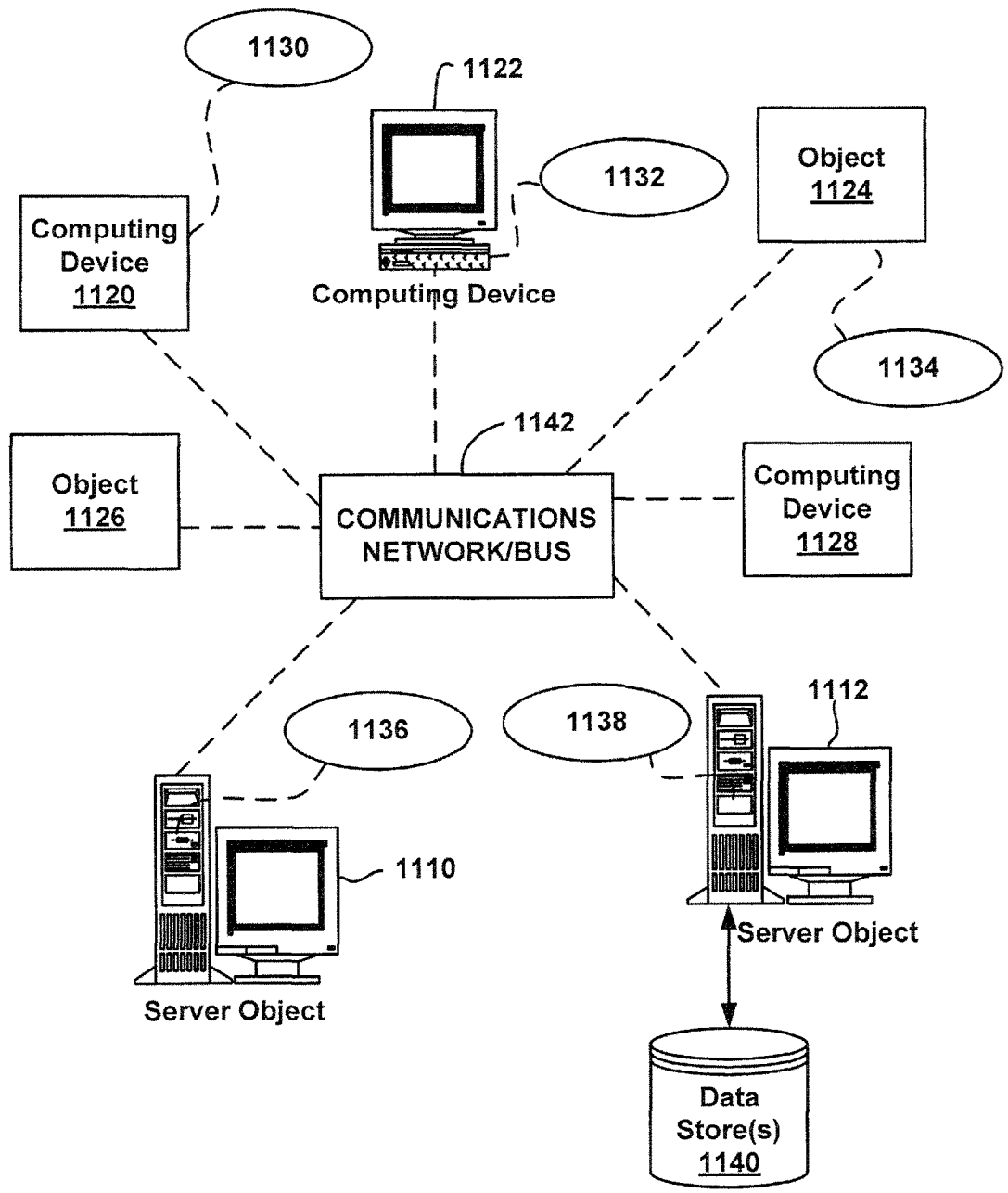
FIG. 11 illustrates a block diagram of an example data communication network that can be operable in conjunction with various aspects described herein.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1110, 1112, etc. and computing objects or devices 1120, 1122, 1124, 1126, 1128, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1140 can include memory or other similar data stores as disclosed herein.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system for optimizing memory mappings associated with a plurality of network nodes in a multi-node system, comprising:

a first network node of the plurality of nodes configured for generating a memory page request in response to an invalid memory access associated with a virtual central processing unit of the first network node and, in response to a determination that a second network node of the plurality of nodes comprises a memory space associated with the memory page request, transmitting the memory page request to the second network node via a communication channel; and the second network node configured for receiving the memory page request, retrieving a memory page request associated with the memory page request, and transmitting the memory page to the first network device via the communication channel, the first network node being further configured for mapping a memory page associated with the memory page request based on a set of memory page mappings stored by the first network node.

2. The system of claim 1, wherein the first network node is configured for modifying a page table entry associated with the memory page during the mapping of the memory page.

3. The system of claim 1, wherein the first network node comprises a memory configured for storing the set of memory page mappings in response to a determination that an operating system associated with the second network node satisfies a defined criterion.

4. The system of claim 1, wherein the first network node is configured for mapping, in response to a determination that the first network node comprises the memory space, the memory page associated with the memory page request based on a page table entry address of the memory page.

5. The system of claim 4, wherein the first network node is configured for modifying a page table entry associated with the page table entry address during the mapping of the memory page.

6. The system of claim 4, wherein the first network node comprises a memory configured for storing the page table entry address in response to a determination that an operating system associated with the second network node satisfies a defined criterion.

7. The system of claim 1, wherein the memory space is associated with a guest physical address, and wherein the first network node is configured for mapping a guest physical address page based on a page table entry address stored by the first network node.

8. The system of claim 1, wherein the first network node is configured for mapping the memory page to a physical address associated with the first network node.

9. The system of claim 1, wherein the first network node is a first system on a chip (SoC) and the second network node is a second SoC different from the first SoC.

10. A method for optimizing memory mappings associated with a plurality of network nodes in a multi-node system, the method comprising, by a first network node of the plurality of the network nodes:

generating a memory page request in response to an invalid memory access associated with a first network device;

in response to a determination that a second network node of the plurality of network nodes comprises a memory page associated with the memory page request, transmitting the memory page request to the second network node via a communication channel, receiving, from the second network device and via the communication channel, a memory page associated with the memory page request;

determining a page table entry associated with the memory page based on a set of memory page mappings stored by the first network device; and performing a memory mapping process associated with the page table entry.

11. The method of claim 10, wherein the first network node is a first system on a chip (SoC) and the second network node is a second SoC different from the first SoC.

12. The method of claim 10, wherein the receiving comprises receiving a memory page associated with the memory page request from a memory of the second network device in response to a determination that the memory of the network device comprises a memory space associated with the memory page request.

13. The method of claim 10, further comprising:
determining whether an operating system associated with the first network device satisfies a defined criterion; and
storing the set of memory page mappings in response to a determination that the operating system satisfies the defined criterion.

14. The method of claim 10, wherein the determining page table entry comprises determining the page table entry without performing a page table walk process.

15. The method of claim 10, wherein the performing memory mapping process comprises modifying the page table entry.

16. A network device in a multi-device system, the network device comprising:

a memory configured for storing a set of memory page mappings; and a memory manager configured for:
generating a memory page request in response to an invalid memory access associated with the network device, in response to a determination that a second network device in the multi-device system comprises a memory page associated with the memory page request, transmitting the memory page request to the second network device via a communication channel, receiving, from the second network device and via the communication channel, a memory page associated with the memory page request, determining a page table entry associated with the memory page based on the set of memory page mappings, and performing a memory mapping process associated with the page table entry.

17. The network device of claim 16, wherein the first network node is a first system on a chip (SoC) and the second network node is a second SoC different from the first SoC.

18. The network device of claim 16, wherein the memory manager is configured for storing the set of memory page mappings in the memory in response to a determination that an operating system associated with the network device satisfies a defined criterion.

19. The network device of claim 16, wherein the memory manager is configured for determining the page table entry based on a hash function associated with a memory address for the memory page.

20. The network device of claim 16, wherein the memory manager is configured for modifying the page table entry during the memory mapping process.

* * * * *